United States Patent
Sabat, Jr. et al.

(10) Patent No.: US 9,668,142 B2
(45) Date of Patent: *May 30, 2017

(54) OPERATIONS AND MAINTENANCE ARCHITECTURE FOR MULTIPROTOCOL DISTRIBUTED SYSTEM

(71) Applicant: CommScope Technologies LLC, Hickory, NC (US)

(72) Inventors: John Sabat, Jr., Merrimack, NH (US); Jeffrey R. Millar, Mont Vernon, NH (US)

(73) Assignee: CommScope Technologies LLC, Hickory, NC (US)

( * ) Notice: Subject to any disclaimer, the term of this patent is extended or adjusted under 35 U.S.C. 154(b) by 682 days.

This patent is subject to a terminal disclaimer.

(21) Appl. No.: 14/147,005

(22) Filed: Jan. 3, 2014

(65) Prior Publication Data

US 2014/0120870 A1 May 1, 2014

Related U.S. Application Data

(63) Continuation of application No. 13/169,561, filed on Jun. 27, 2011, now Pat. No. 8,762,510, which is a
(Continued)

(51) Int. Cl.
*H04W 16/14* (2009.01)
*H04L 29/06* (2006.01)
(Continued)

(52) U.S. Cl.
CPC ......... *H04W 16/14* (2013.01); *H04L 41/0213* (2013.01); *H04L 63/0227* (2013.01);
(Continued)

(58) Field of Classification Search
CPC ..... H04W 16/14; H04W 12/08; H04W 24/00; H04W 88/00; H04L 63/0227; H04L 69/08; H04L 41/0213
See application file for complete search history.

(56) References Cited

U.S. PATENT DOCUMENTS

| 4,183,054 A | 1/1980 | Patisaul et al. |
| 4,611,323 A | 9/1986 | Hessenmuller |

(Continued)

FOREIGN PATENT DOCUMENTS

| EP | 0391597 | 10/1990 |
| EP | 0876073 | 11/1998 |

(Continued)

OTHER PUBLICATIONS

Canadian Intellectual Property Office, "Office Action", "from Foreign Counterpart of U.S. Appl. No. 09/821,820", Aug. 5, 2008, pp. 1-2, Published in: CA.

(Continued)

*Primary Examiner* — Nam Huynh
(74) *Attorney, Agent, or Firm* — Fogg & Powers LLC

(57) ABSTRACT

One embodiment is directed to a system comprising a first unit and remotely located second units. The first unit comprises a transport medium interface to produce a common transport signal from first and second wireless service provider signals and to communicate the common transport signal on a common transport medium. Each second unit comprises first and second equipment associated with first and second wireless service providers, respectively. The first and second equipment in each second unit produces a respective first and second wireless service signal to be radiated from at least one antenna associated with that second unit. The system further comprises a common network management system configured to: receive first and second control messages from first and second wireless service provider network management systems, respectively, and forward the first and second control messages to the first and second equipment, respectively, in the second units using the common transport medium.

18 Claims, 10 Drawing Sheets

Related U.S. Application Data continuation of application No. 11/940,817, filed on Nov. 15, 2007, now Pat. No. 7,991,903, which is a continuation of application No. 09/821,820, filed on Mar. 29, 2001, now Pat. No. 7,313,626.

(60) Provisional application No. 60/192,870, filed on Mar. 29, 2000.

(51) Int. Cl.
| | |
|---|---|
| H04W 12/08 | (2009.01) |
| H04L 12/24 | (2006.01) |
| H04W 24/00 | (2009.01) |
| H04W 88/00 | (2009.01) |

(52) U.S. Cl.
CPC .............. *H04L 69/08* (2013.01); *H04W 12/08* (2013.01); *H04W 24/00* (2013.01); *H04W 88/00* (2013.01)

(56) References Cited

U.S. PATENT DOCUMENTS

| | | | |
|---|---|---|---|
| 4,628,501 | A | 12/1986 | Loscoe |
| 4,654,843 | A | 3/1987 | Roza et al. |
| 4,691,292 | A | 9/1987 | Rothweiler |
| 4,999,831 | A | 3/1991 | Grace |
| 5,193,109 | A | 3/1993 | Chien-Yeh Lee |
| 5,243,598 | A | 9/1993 | Lee |
| 5,303,287 | A | 4/1994 | Laborde |
| 5,321,736 | A | 6/1994 | Beasley |
| 5,321,849 | A | 6/1994 | Lemson |
| 5,339,184 | A | 8/1994 | Tang |
| 5,381,459 | A | 1/1995 | Lappington |
| 5,400,391 | A | 3/1995 | Emura et al. |
| 5,457,734 | A | 10/1995 | Eryaman et al. |
| 5,461,627 | A | 10/1995 | Rypinski |
| 5,519,691 | A | 5/1996 | Darcie et al. |
| 5,530,945 | A | 6/1996 | Chavez, Jr. et al. |
| 5,546,397 | A | 8/1996 | Mahany |
| 5,566,168 | A | 10/1996 | Dent |
| 5,594,740 | A | 1/1997 | LaDue |
| 5,608,447 | A | 3/1997 | Farry et al. |
| 5,621,786 | A | 4/1997 | Fischer et al. |
| 5,627,879 | A | 5/1997 | Russell et al. |
| 5,642,405 | A | 6/1997 | Fischer et al. |
| 5,644,622 | A | 7/1997 | Russell et al. |
| 5,657,374 | A | 8/1997 | Russell et al. |
| 5,732,076 | A | 3/1998 | Ketseoglou et al. |
| 5,761,619 | A | 6/1998 | Danne et al. |
| 5,781,541 | A | 7/1998 | Schneider |
| 5,781,859 | A | 7/1998 | Beasley |
| 5,781,865 | A | 7/1998 | Gammon |
| 5,802,173 | A | 9/1998 | Hamilton-Piercy et al. |
| 5,805,983 | A | 9/1998 | Naidu et al. |
| 5,809,395 | A | 9/1998 | Hamilton-Piercy et al. |
| 5,809,431 | A | 9/1998 | Bustamante et al. |
| 5,818,385 | A | 10/1998 | Bartholomew |
| 5,822,324 | A | 10/1998 | Kostresti et al. |
| 5,828,661 | A | 10/1998 | Weaver, Jr. et al. |
| 5,848,063 | A | 12/1998 | Weaver, Jr. et al. |
| 5,852,651 | A | 12/1998 | Fischer et al. |
| 5,880,701 | A | 3/1999 | Bhame et al. |
| 5,907,544 | A | 5/1999 | Rypinski |
| 5,926,470 | A | 7/1999 | Tiedemann, Jr. |
| 5,936,754 | A | 8/1999 | Ariyavisitakul et al. |
| 5,963,625 | A | 10/1999 | Kawecki et al. |
| 5,987,014 | A | 11/1999 | Magill et al. |
| 6,023,612 | A | 2/2000 | Harris et al. |
| 6,047,176 | A | 4/2000 | Sakamoto et al. |
| 6,108,550 | A | 8/2000 | Wiorek et al. |
| 6,222,503 | B1 | 4/2001 | Gietema et al. |
| 6,226,274 | B1 | 5/2001 | Reese et al. |
| 6,236,365 | B1 | 5/2001 | LeBlanc et al. |
| 6,259,910 | B1 | 7/2001 | Fairfield et al. |
| 6,266,013 | B1 | 7/2001 | Stilp et al. |
| 6,539,239 | B1 | 3/2003 | Loughran et al. |
| 6,667,973 | B1 | 12/2003 | Gorshe et al. |
| 6,768,745 | B1 | 7/2004 | Gorshe et al. |
| 7,395,072 | B2 | 7/2008 | Gudmundsson et al. |
| 7,830,841 | B1 | 11/2010 | Roberts et al. |
| 2002/0023160 | A1 | 2/2002 | Garrett et al. |
| 2002/0167954 | A1 | 11/2002 | Highsmith et al. |
| 2003/0157943 | A1 | 8/2003 | Sabat, Jr. |
| 2004/0010609 | A1 | 1/2004 | Vilander et al. |

FOREIGN PATENT DOCUMENTS

| | | |
|---|---|---|
| EP | 0877532 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |

OTHER PUBLICATIONS

European Patent Office, "Office Action", "from Foreign Counterpart of U.S. Appl. No. 09/821,820", Dec. 14, 2006, pp. 1-6, Published in: EP.

U.S. Patent and Trademark Office, "Advisory Action", "from U.S. Appl. No. 09/821,820", Apr. 3, 2006, pp. 1-2, Published in: US.

U.S. Patent and Trademark Office, "Final Office Action", "from U.S. Appl. No. 09/821,820", Dec. 23, 2005, pp. 1-12, Published in: US.

U.S. Patent and Trademark Office, "Notice of Allowance", "from U.S. Appl. No. 09/821,820", Aug. 10, 2007, pp. 1-4, Published in: US.

U.S. Patent and Trademark Office, "Supplemental Notice of Allowability", "from U.S. Appl. No. 09/821,820", Oct. 16, 2007, pp. 1-3, Published in: US.

U.S. Patent and Trademark Office, "Office Action", "from U.S. Appl. No. 09/821,820", Jan. 24, 2005, pp. 1-12, Published in: US.

U.S. Patent and Trademark Office, "Office Action", "from U.S. Appl. No. 09/821,820", Feb. 21, 2007, pp. 1-6, Published in: US.

U.S. Patent and Trademark Office, "Notice of Allowance", "from U.S. Appl. No. 11/940,817", Apr. 18, 2011, pp. 1-11, Published in: US.

U.S. Patent and Trademark Office, "Office Action", "from U.S. Appl. No. 11/940,817", Sep. 14, 2010, pp. 1-20, Published in: US.

U.S. Patent and Trademark Office, "Notice of Allowance", "from U.S. Appl. No. 13/169,561", Oct. 4, 2013, pp. 1-19, Published in: US.

U.S. Patent and Trademark Office, "Office Action", "from U.S. Appl. No. 13/169,561", Apr. 27, 2012, pp. 1-30, Published in: US.

European Patent Office, "International Preliminary Examination Report", "from PCT Counterpart of U.S. Appl. No. 09/821,820", Jul. 16, 2002, pp. 1-9, Published in: EP.

European Patent Office, "International Search Report", "from PCT Counterpart of U.S. Appl. No. 09/821,820", Jun. 3, 2002, pp. 1-6, Published in: EP.

European Patent Office, "Written Opinion", "from PCT Counterpart of U.S. Appl. No. 09/821,820", Jun. 13, 2002, pp. 1-2, Published in: EP.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

(56) References Cited

OTHER PUBLICATIONS

Iannone et al., "High-Speed Point-to-Point and Multiple Broadcast Services Delivered over a WDM Passive Optical Network", "IEEE Photonics Technology Letters", Sep. 9, 1998, pp. 1328-1330, vol. 10, No. 9.
Lin et al., "Heterogeneous Personal Communications Services: Integration of PCS Systems", "IEEE Communications Magazine", Sep. 1996, pp. 1-18, Publisher: IEEE.
U.S. Patent and Trademark Office, "Notice of Allowance", "from U.S. Appl. No. 13/169,561", Feb. 19, 2014, pp. 1-14, Published in: US.

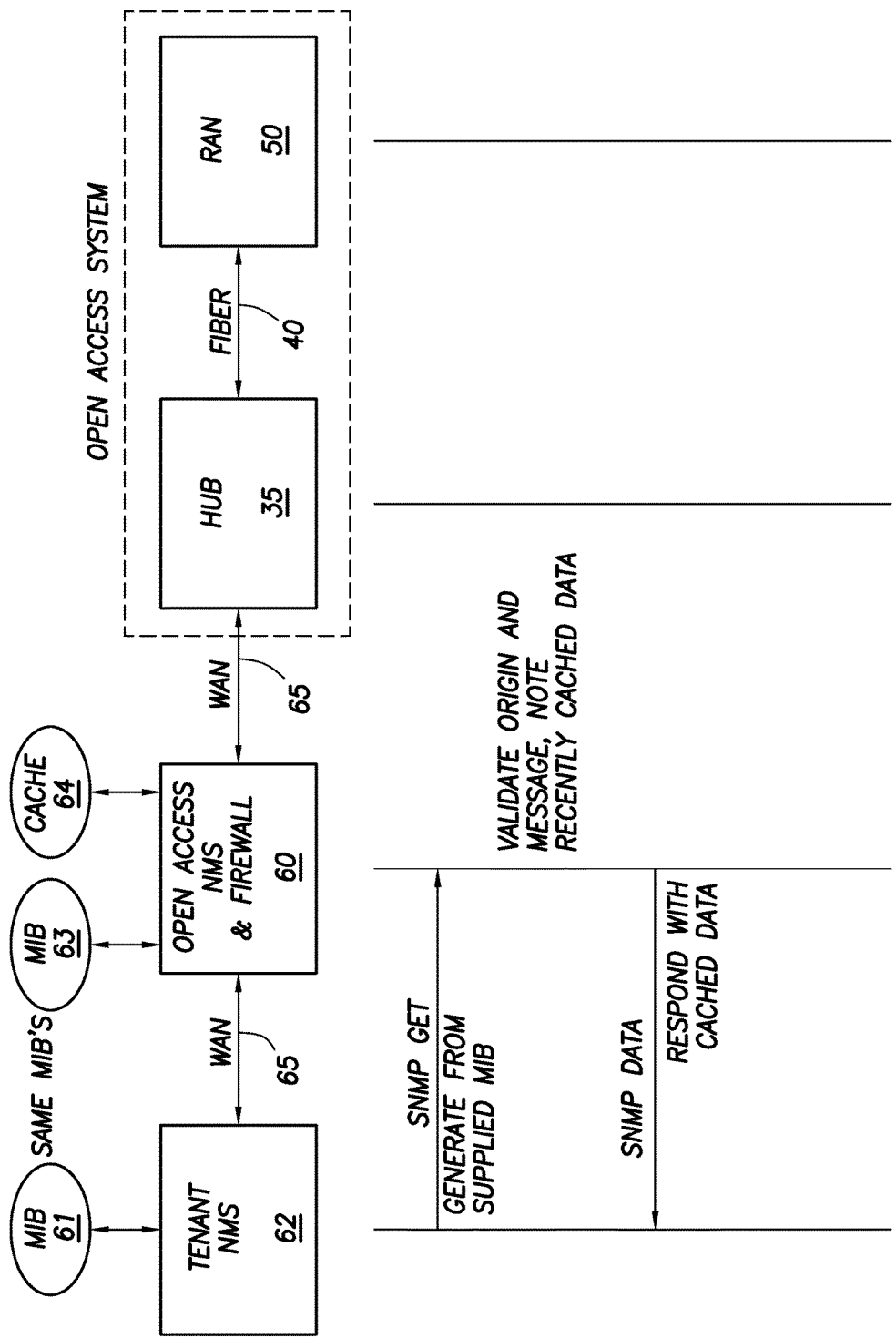

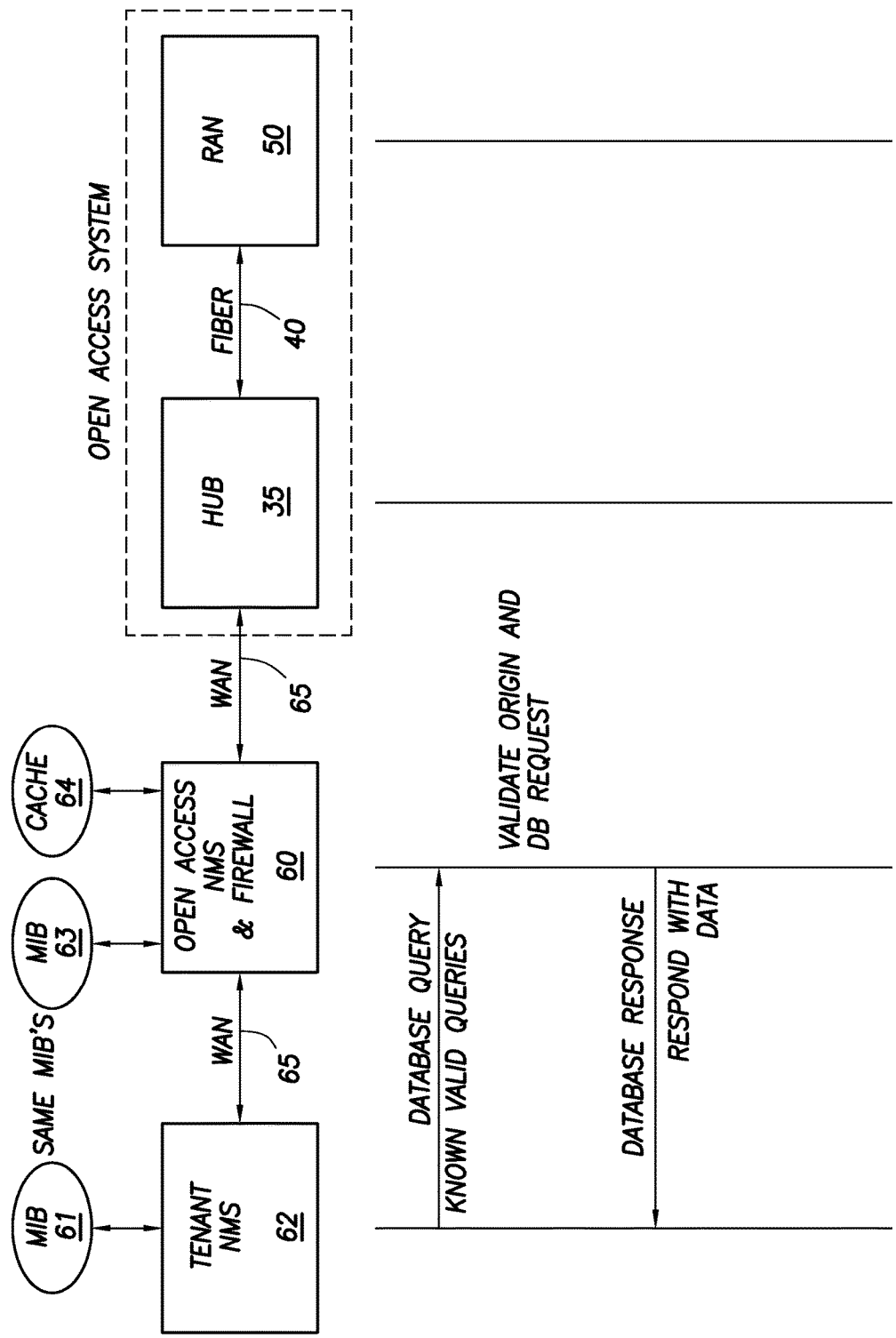

OPERATIONS AND MAINTENANCE ARCHITECTURE FOR MULTIPROTOCOL DISTRIBUTED SYSTEM

RELATED APPLICATIONS

This application is a continuation of U.S. patent application Ser. No. 13/169,561, filed on Jun. 27, 2011, which is a continuation of U.S. patent application Ser. No. 11/940,817, filed on Nov. 15, 2007 and issued as U.S. Pat. No. 7,991,903, which is a continuation of U.S. patent application Ser. No. 09/821,820, filed on Mar. 29, 2001 and issued as U.S. Pat. No. 7,313,626, which claims the benefit of U.S. Provisional Application Ser. No. 60/192,870, filed on Mar. 29, 2000. The entire teachings of the above applications are hereby incorporated herein by reference.

BACKGROUND

The wireless telecommunication industry continues to experience significant growth and consolidation. In the United States, market penetration is near 32% with approximately 86 million users nationwide. In 1999 the total number of subscribers increased 25% over the previous year, with the average Minutes of Use (MOU) also increasing by about 20% per user. If one considers growth in the digital market, in as short as three years, the digital subscriber base has grown to 49 million users, or approximately equal to the installed number of users of analog legacy systems. Even more interesting is an observation by Verizon Mobile that 70% of their busy hour traffic (an important system design parameter) is digital traffic, although only approximately 40% of the total number of their subscribers are digital users. The Verizon Mobile observation indicates the digital subscriber will drive the network design through its increasing usage, whereas the analog user is truly a passive "glovebox" subscriber.

Similar growth has been witnessed in other countries, especially in Northern and Western Europe, where market penetration is even higher, approaching 80% in some areas, and digital service is almost exclusively used.

With the availability of Personal Communications Service (PCS) frequencies in the United States, and additional continuing auctions of spectrum outside of the traditional 800-900 MegaHertz (MHz) radio band, the past few years have also seen increased competition among service providers. For example, it has also been estimated that 88% of the US population has three or more different wireless service providers from which to choose, 69% have five or more, and about 4% have as many as seven service providers in their local area.

In 1999 total wireless industry revenue increased to $43B, representing an approximate 21% gain over 1998. However, a larger revenue increase would have been expected given the increased subscriber count and usage statistics. It is clear that industry consolidation, the rush to build out a nationwide footprint by multiple competing service providers, and subsequent need to offer competitive pricing plans has had the effect of actually diminishing the dollar-per-minute price that customers are willing to pay for service.

These market realities have placed continuing pressure on system designers to provide system infrastructure at minimum cost. Radio tower construction companies continue to employ several business strategies to serve their target market. Their historical business strategy, is build-to-suit (i.e., at the specific request and location as specified by a wireless operator). But some have now taken speculation approach, where they build a tower where it may be allowed by local zoning and the work with the new service providers to use the already existing towers. The speculative build spawned by the recently adopted zoning by-law is actually encouraged by communities to mitigate the "unsightly ugliness" of cellular phone towers. Towns adopted the bylaws to control tower placement since Federal laws prohibit local zoning authorities to completely ban the deployment of wireless infrastructure in a community. Often the shared tower facility is zoned far removed from residential areas, in more commercialized areas of town, along heavily traveled roads, or in more sparsely populated rural sections. But providing such out of the way locations for towers often does not fully address each and every wireless operator's capacity or coverage need.

Each of the individual wireless operators compete for the household wireline replacement, and as their dollar-per-MOU is driven down due to competition in the "traditional" wireless space, the "at home" use is one of the last untapped markets. As the industry continues to consolidate, the wireless operator will look for new ways to offer enhanced services (coverage or products) to maintain and capture new revenue.

Considering the trends that have appeared over recent years, when given the opportunity to displace the household wireline phone with reliable wireless service, a wireless service operator may see their average MOUs increase by a factor of 2 to 4, thereby directly increasing their revenue potential 200 to 400%. In order to achieve this, the wireless operator desires to gain access throughout a community as easily as possible, in both areas where wireless facilities are an allowed use and in where they are not, and blanket the community with strong signal presence.

SUMMARY

Certain solutions are emerging that provide an alternative to the tower build out approach. In particular, wireless signal distribution systems may employ a high speed distribution media such as a cable television infrastructure or optical fiber data network to distribute Radio Frequency (RF) signals. This allows the capacity of a single base station to be distributed over an area which is the equivalent of multiple microcellularsites without degradation in RF signal quality.

However, even these systems have a shortcoming in that they are typically built out for one selected over the air protocol and are controlled by a single service provider. Thus, even with such systems as they are presently known, it becomes necessary to build out and overlay multiple base stations and multiple signal distribution networks for multiple service providers.

The present invention is an open access signal distribution system in which a variety of wireless voice, data and other services and applications are supported. The open access systems makes use of a distributed Radio Frequency (RF) distribution network and associated Network Management System (NMS) entities that enable the system operator to employ a wireless infrastructure network that may be easily shared among multiple wireless service providers in a given community. The open access system provides the ability for such operators and service providers to share access to the infrastructure regardless of the specific RF air interface or other signal formatting and/or managing messaging formats that such operators choose to deploy.

More particularly, the present invention is concerned with a technique for implementing an open access Network Management System (NMS) that acts a common control message interface for respective network management systems operated by multiple wireless service providers in a given community. This open network management system consists of a software element that communicates control messages with open access system elements, such as radio hubs and Remote Access Nodes (RANs). In the preferred embodiment, the control messages consist of Simple Network Management Protocol (SNMP) messages and other similar messages using, for example, Transmission Control Protocol-Internet Protocol (TCP/IP) packets.

The open access NMS architecture enables different tenants to have access to the control and status information they need in a familiar form while preventing access to information that they do not need to have or have their privilege is to see. For example, the open access Network Management System preferably includes a statefull firewall for SNMP traffic. The statefull firewall looks like an SNMP agent for the tenant interfaces, but looks like an SNMP client to the open access system elements such as the radio hubs and RANs. The statefull firewall software system contains configuration information that defines which SNMP privileges a particular tenant client may use, such as based on the IP address of the client.

The open access NMS thus provides each respective wireless operator with a set of alarms, operation and maintenance signaling, built-in testing and other remote control messaging privileges for their own respective wireless access systems. They can thus perform SNMP functions for the open access system elements using their own tenant-specific Network Management System (tenant NMS). However, a hierarchy is employed between the tenant NMSs and the open access system NMS, to minimize the signaling across multiple wireless operators, and to, perhaps more importantly, create a firewall to prevent one tenant from obtaining information from or even sending control messages to open system elements that are under the control of other tenants.

The open network management system also provides a facility whereby information to which common access is needed maybe cached or accessed through database queries. In particular, the open access NMS can autonomously initiate queries to the open access system elements to determine status information, and then place this information in its own database. This serves two purposes. First, when an SNMP request message is received from a tenant NMS, the local database can be queried for the information rather than sending request messages out to the system elements. This prevents unnecessary network traffic when a different tenant NMS's are making queries for common information such as, for example, fault states, temperature information and the like which should be sharable among the various system operators. A second benefit is provided in that relatively large amounts of data can be passed to the tenant NMS without crating correspondingly large amounts of traffic on the internal open access system communication network.

DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 illustrates a messaging scheme where a caching firewall is used to reduce SNMP message traffic to the open system components.

FIG. 10 is an illustration of how tenants may gatherblocks of data from an operator NMS without incurring overhead of SNMP.

DETAILED DESCRIPTION

Figure 1:
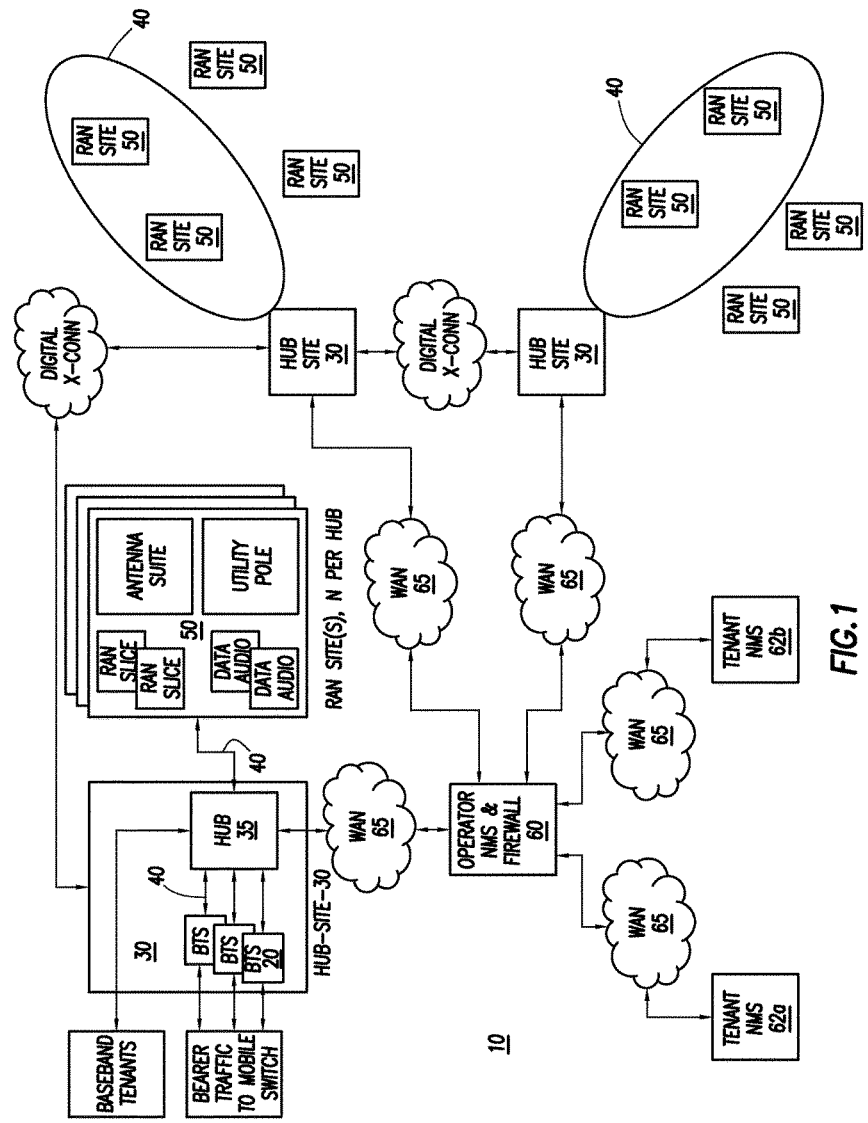
FIG. 1 is a block diagram of an open access system according to the invention.

Turning attention now to the drawings more particularly, FIG. 1 is a diagram of an open access system 10. The open access system 10 is an open access network supporting a multitude of wireless voice, data, video services and applications. Wireless Service Providers (WSP) and Wireless Internet Service (WISP) Providers, commonly known herein also as tenants, may use open access system 10 to either enhance or replace existing networks, wired or wireless, or to develop new networks.

Open access system 10 is a multi-frequency, multi-protocol Radio Frequency (RF) access network, providing cellular, Personal Communication Services (PCS), and wireless data coverage via a distributed RF access system. Open access system 10 is comprised of base transceiver stations (BTSs) 20, located at hub sites 30. The base stations 20 are connected via high speed data links 40 to distributed RF access nodes (RANs) 50. The system 10 is, in effect, a signal distribution network and associated management entities that enable a network operator to deploy a wireless infrastructure network that may easily be shared among multiple wireless system operators in a given community. The open access network may be shared regardless of the specific RF air interface formatting and management messaging formats that each wireless operator chooses to deploy.

Figure 2:
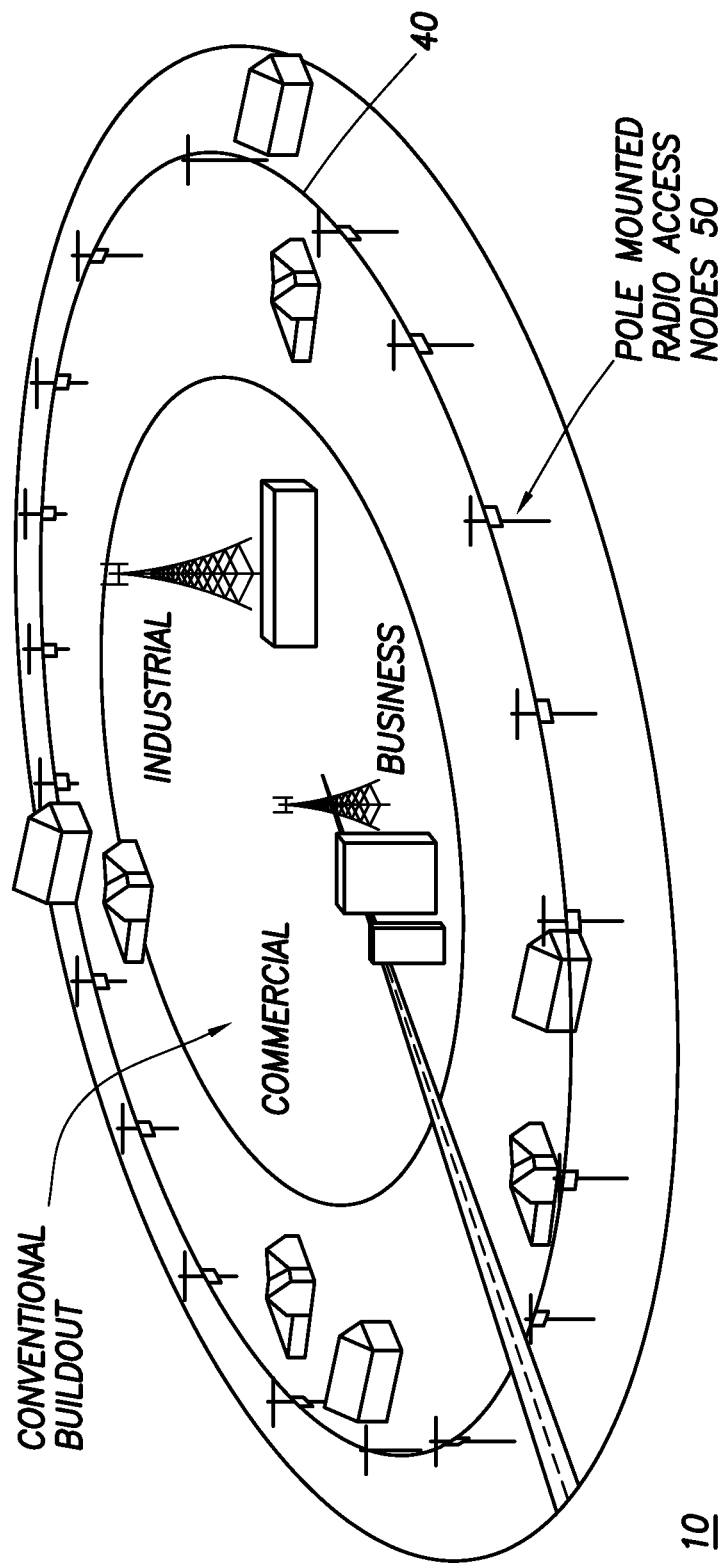
FIG. 2 illustrates one possible deployment for the open access system.

FIG. 2 depicts one possible deployment scenario for the open access system 10. As shown, the system consists of a multiple Radio Frequency (RF) Access Node 50 (RAN) units that may be located at relatively lower height locations such as utility poles. The open access network 10 distributes RF signals to and from the RANs 50, using a shared transport media 40 such as an optical fiber using high speed transport signaling. The physical deployment of the open access system is thus quite different from the higher radio towers required in a conventional system.

Returning attention to FIG. 1, the hub 35 provides the hardware and software interfaces between the high speed data link 40 and the individual wireless carrier base stations 20. The base stations 20 are considered to be original equipment manufacturer (OEM) type equipment to be provided and/or specified by the tenant 15 and are not provided as part of the open access system 10 itself Hub 35 co-locates with the base stations 20 at a designated hub site 30. In a maximum configuration, a 3-sector base station 20 connects to 24 RAN Units 50, via an open access Hub 35. Hub 35 can be expanded to connect multiple base stations 20 (one or multiple wireless carriers) and their associated RAN Units 50.

RAN units 50 are distributed throughout a given community in accordance with the network operator's RF plan. RAN Units 50, along with associated antennas 56, are typically installed on utility poles 58, and connect to Hub Unit 35 via a fiber optic cable 40.

An operator controlled, common or open access Network Management System 60 provides remote monitoring and control of the open access network 10 by the network operator. The open access Network Management System 60 also allows for the network operator to pass selected control or status information concerning the open access network 10 to or from the individual wireless carriers or tenants. The present invention relates in particular to the manner in which the open access NMS 60 communicates with tenant NMSs 62a, 62b. By "tenant" herein, it is meant to refer to the wireless carrier, Wireless Service Provider (WSP), or other business entity that desires to provide wireless service to end customers using the open access system 10.

The open access system 10 supports essentially any wireless protocol to be an open access platform. In one configuration, open access system 10 supports the multiple 800/1900 MHz and/or WCS/ISM/MMDS/U-NII wireless service providers, and wireless data providers who require last mile access to their targeted customers, all at the same time.

In a preferred configuration, the open access network consists of radio access nodes (RAN) 50 distributed to achieve the desired RF signal presence and a hub 35 and high speed data link 40, which interconnects the base station RF signals with the RANs 50.

The distributed architecture is comprised of multi-protocol, frequency-independent radio access nodes 50. In the preferred embodiment at the present time, each RAN 50 supports from 1 to 8 tenants of various protocols and frequencies. It should be understood that other configurations could support a smaller or greater number of tenants per RAN 50. Within each RAN 50, the wireless service provider "tenants" have typically leased space from the operator of the open access system 10, so that the operators can install corresponding, appropriate individual radio elements in a RAN slice 52. Each HUB 35 can scale to support one to three sectors each for multiple base stations 20. It should be understood that base stations with a greater number of sectors 20 may also be supported.

RANs 50 are interconnected via fiber links 40 to centrally located HUB sites 30 and associated base stations 20. RANs 50 provide a wide area distribution network that is logically a "horizontal radio tower" with access provided to a single "tenant" or shared amongst multiple tenants (wireless service providers). The generic architecture supports scaling from a single operator to supporting up to multiple operators across the multiple frequency bands per shelf. Multiple slices may be stacked to serve additional tenants, as needed.

Open access network elements such as the HUBs 35 and RANs 50 incorporate a System Network Management Protocol (SNMP) communication scheme to facilitate integration with the host operator's open access network management system (NMS) 60. The open access NMS is in turn connected to tenant-specific NMSs 62a, 62b through convenient data networking equipment such as wide area data networks (WANs) 65. This architecture allows easy and complete communication across the open access system 10 with a high level of control and visibility. The preferred manner in which the open access NMS 60 coordinates requests from tenant NMSs 62a, 62b to communicate SNMP messages with the open access system elements is described below.

Figure 3:
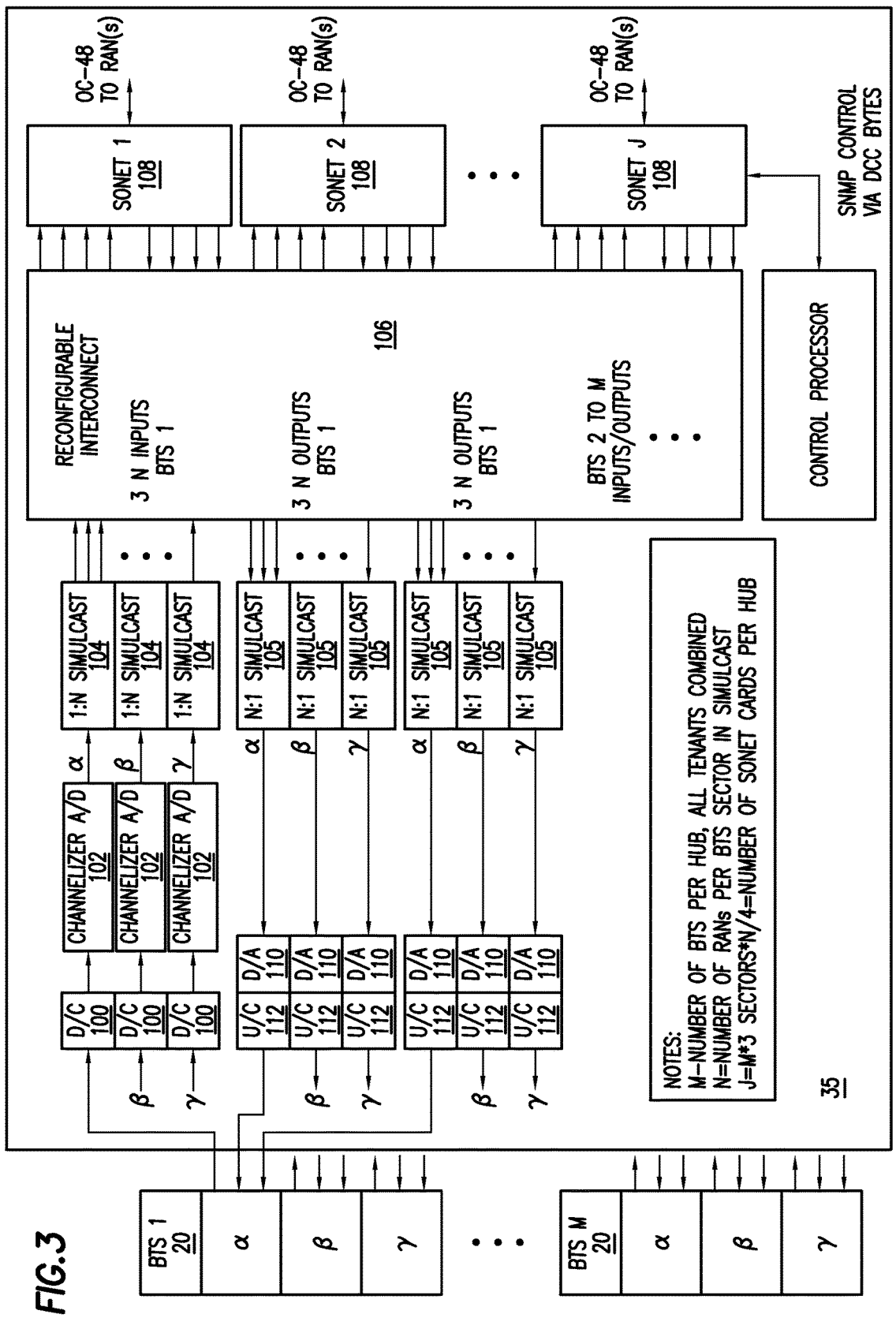
FIG. 3 is a more detailed diagram of a hub signal path for the open access system.

But before discussing the NMS messaging hierarchy, it is instructive to understand the basic functionality of the open access system elements. Referring now to FIG. 3, an RF signal is transmitted from a BTS 20 to open access hub 35. The RF signal is of any bandwidth up to typically 15 MHz (but future bandwidths may be greater) and follows the hub signal path as shown in FIG. 3. The signal is down converted to a 50 MHz (+/−7.5 MHz) Intermediate Frequency (IF) signal by the down converter (D/C) 100. The IF signal is then converted to a 14 bit-wide data stream, at least at 42.953 Msps, by analog-to-digital (A/D) channelizer 102. Two control bits are added to the stream at a field programmable gate array (FPGA) within the A/D channelizer 102. These control bits can be used for a link layer to support SNMP messaging between the open access system elements over the fiber 40, or for other purposes. The 16 bit wide stream, still at 42.953 Msps, is then serialized using 8 B/10 B encoding producing a 859 Mbps bit stream or an STS-12 type transport signal. The STS-12 signal is then distributed along a number of paths equal to the number of RANs in simulcast for each BTS sector. The STS-12 signal is preferably transmitted to the designated RAN Units 50 by interconnect 106 cross-connecting the STS-12 signal to a 4:1 multiplexer 108 that converts the STS-12 signal to an OC-48 signal. In a preferred embodiment, as shown in FIG. 1, a base station 20 located at any hub site 30 can transmit its associated signal to any RAN Unit 50 using a digital cross-connect 37 connected between Hubs 35. In one example, lower rate signals (STS-3, 4, etc.) may be combined into higher rate shared transport signals (e.g. OC-192).

Figure 4:
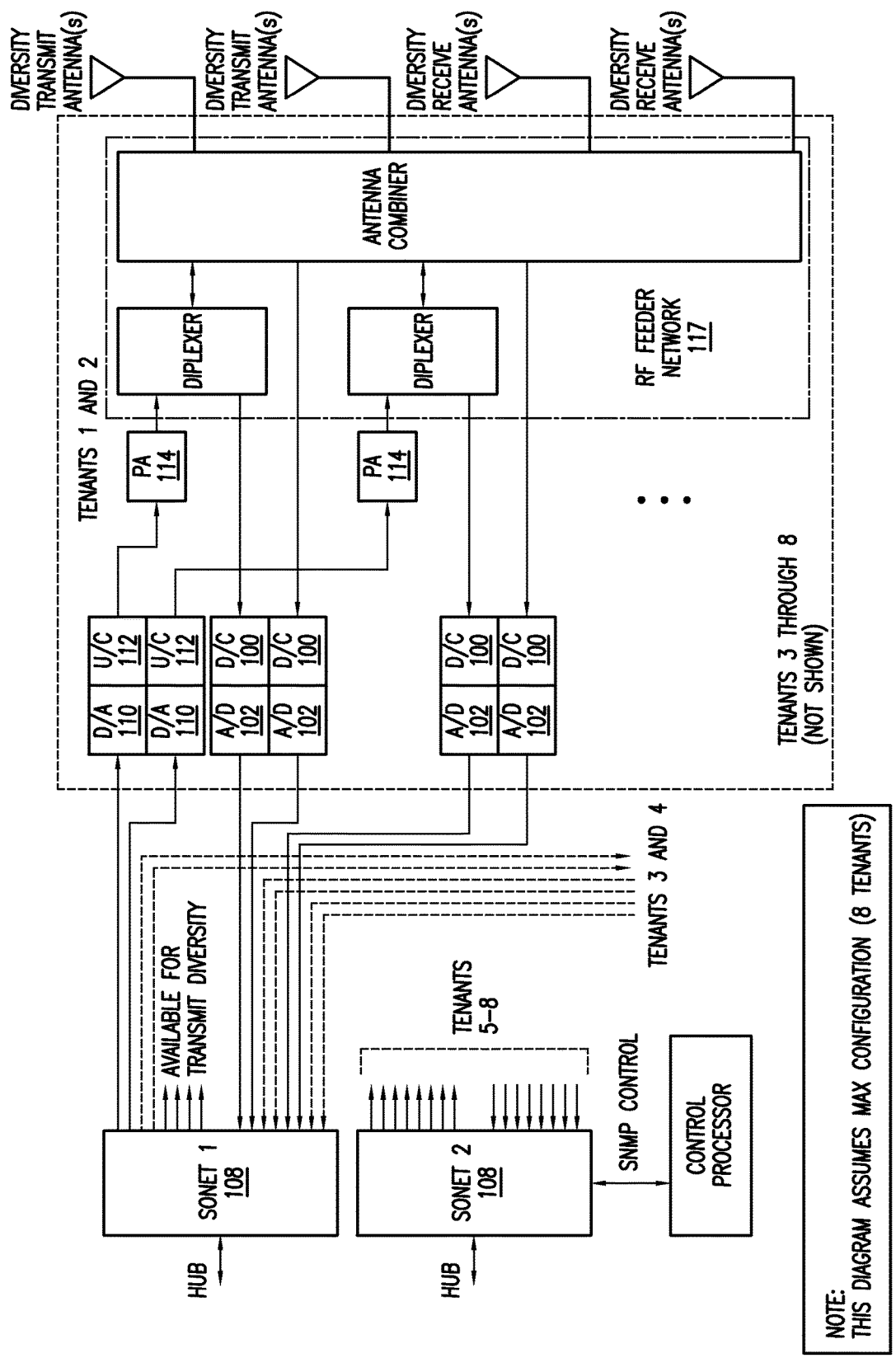
FIG. 4 is a more detailed diagram of a Radio Access Node signal path.

Referring to FIG. 4, the OC-48 signal enters a multiplexer 108 where the signal is converted from an OC-48 signal back to a STS-12 signal. The STS-12 signal is then digital-to-analog (D/A) converted to a 50 MHz (+/−7.5 MHz) signal by the D/A Channelizer 110. The 50 MHz (+/−7.5 MHz) signal is up converted 112 (U/C) to the required RF signal between. The RF signal is then power amplified (PA) 114 at its associated RF frequency and transmitted through RF feed network 117 that couples transmit and receive signals to the same antenna. The RF signal is then radiated by the antenna.

Referring to FIG. 4, an RF signal is received by an antenna or antenna array and the signal is then down converted (D/C) 100 to a 50 MHz (+/−7.5 MHz) signal. The RF signal is then converted to a 14 bit stream, at least at 42.953 Msps, in the (A/D) channelizer 102. Two control bits are added to the bit stream at a digital filter implemented in a Field Programmable Gate Array (FPGA) within the A/D channelizer 102. The 16 byte stream, at least at 42.953 Msps, is serialized using 8 B/10 B encoding producing a 859 Mbps bit stream or STS-12 signal. The STS-12 signal is then combined with the other tenant signals by a 4:1 multiplexer 108 that converts the STS-12 signal to an OC-48 signal. This signal is then transmitted to the designated open access hub 35.

Referring back now to FIG. 3, the OC-48 signal is received at the open access hub 35 at the multiplexer 108 that converts the OC-48 signal to a STS-12 signal. The STS-12 signal is then cross-connected through interconnect 106 to a designated BTS 20. The STS-12 signal is summed up to 8:, 1 (embodiments greater than 8 are also possible) with signals from other RANs in the same simulcast and is then D/A converted 110 to a 50 MHz (+/−7.5 MHz) IF signal. It should be understood that in other configurations, more than 8 signals could be summed together. The 50 MHz signal IF signal is the up converted (U/C) 112 to the desired radio carrier and forwarded to the BTS 20. Providing for two receive paths in the system 10 allows for receive diversity.

The location of the RANs will be selected to typically support radio link reliability of at least 90% area, 75% at cell edge, as a minimum, for low antenna centerline heights in a microcellular architecture. The radio link budgets, associated with each proposed tenant, will be a function of the selected air protocol and the RAN 50 spacing design will need to balance these parameters, to guarantee a level of coverage reliability. For more details concerning link budget allocation, refer to our co-pending U.S. patent application Ser. No. 09/818,986, filed Mar. 27, 2001 (and issued as U.S. Pat. No. 6,963,552).

Figure 5:
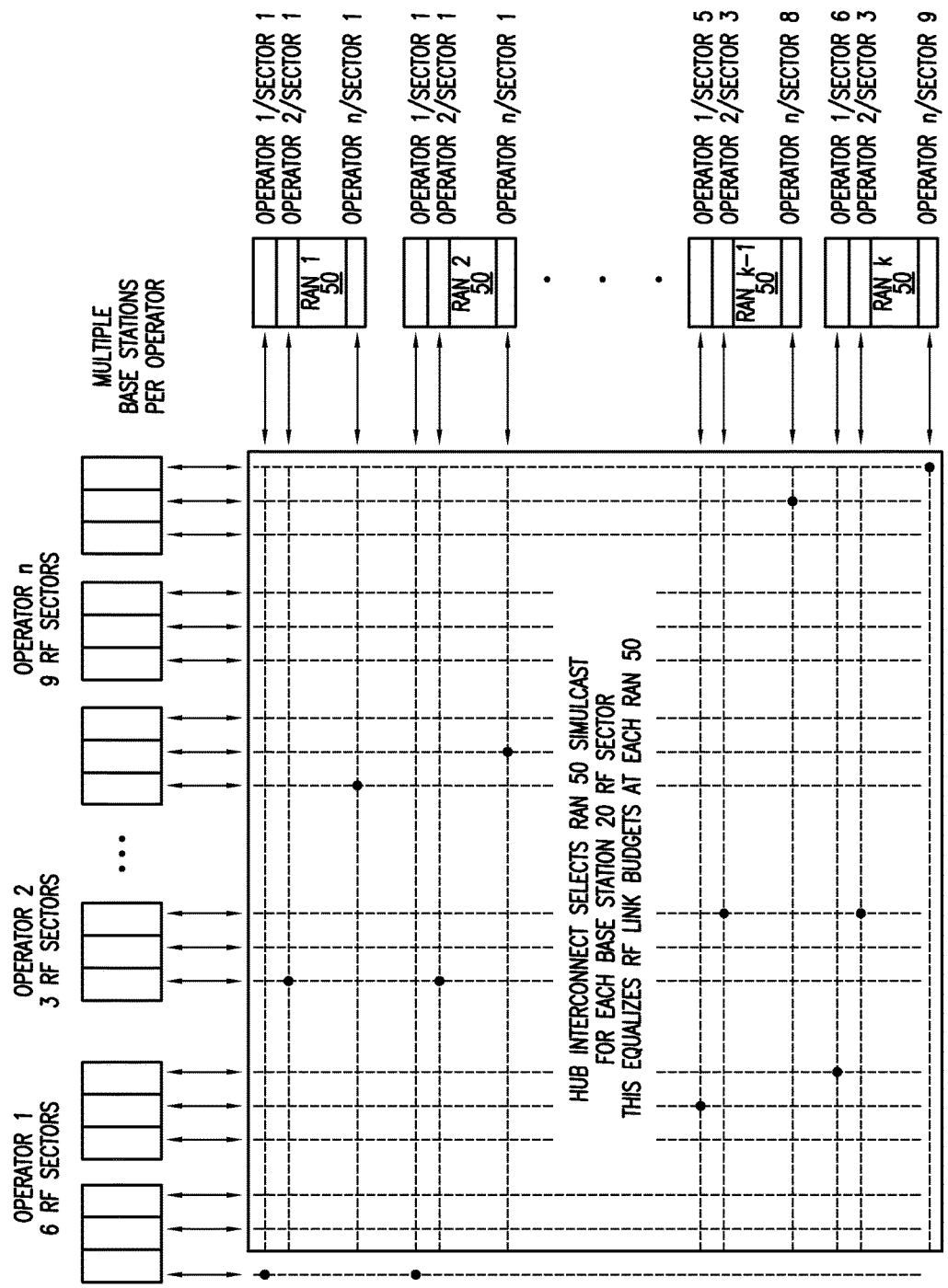
FIG. 5 is a more detailed view of a cross connect providing for the ability to connect multiple base stations for different Wireless Service Providers (WSPs) or tenants of the open system to a network of Radio Access Nodes.

Turning attention now to FIG. 5, this type of infrastructure build-out requires a distributed RF system capable of cross-connecting multiple base stations 20 from different "tenants" or Wireless Service Providers (WSPs) to a network of RANs 50 using distribution ratios that differ for each wireless protocol. A network that does not support this aspect of the invention would simply connect the base station sectors for all the WSPs to the same complement of RANs 50. Sector 1/WSP 1 through sector 1/WSP n would all connect to the same RANs 50. Similarly, sector 2/WSP 1 through sector 2/WSP n connect to a different but common group of RANs 50.

Figure 6:
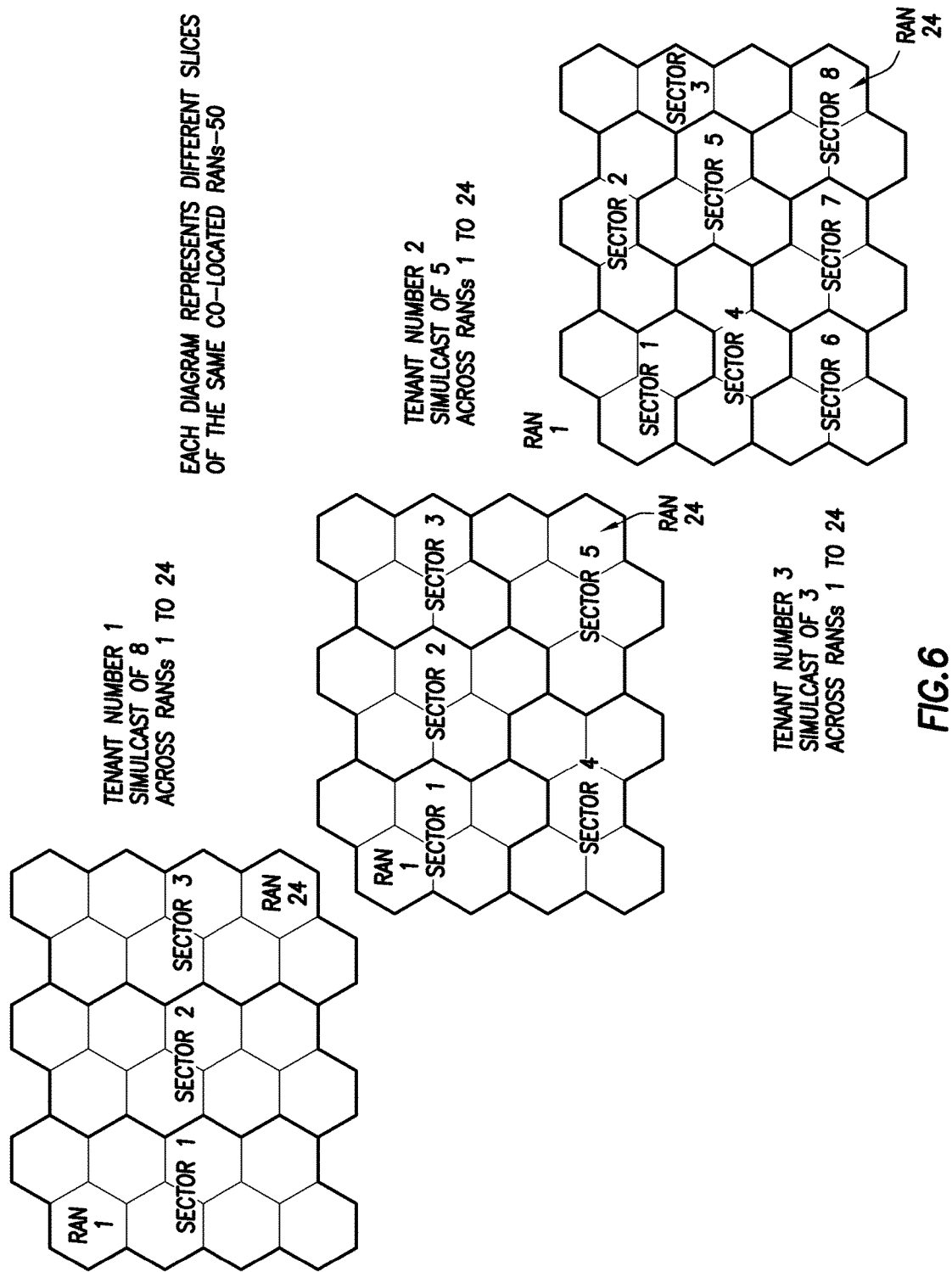
FIG. 6 is a diagram illustrating how RAN slices may be allocated to different tenants and sectors in simulcast.

Referring to FIGS. 5 and 6, the system described by this invention selects a different simulcast scheme for each individual sector of each wireless tenant and the total collection of RANs 50 distributed through a geographic coverage area. For example: Sector1/WSP1 does not necessarily connect to the same complement of RANs 50 as sector 1/WSP 2 through sector 1/WSP n. There may be only partial or even no overlap between the connectivity assignments due to the variable simulcast ratios across the differing protocols. Sector 2/WSP 1 not only does not fully overlap with sector 2/(WSP 2 through n) but also may also partially overlap with sector 1/(2 though n) in RAN assignments.

Referring in particular to the example shown in FIGS. 5 and 6, WSP or tenant 1 is simulcasting a group of 8 RANs within a total number of 24 RANs 50. Each RF sector is connected to a different grouping of 8 RANs. The illustrated drawing in FIG. 6 is for a group of 24 contiguous cells showing how the three tenants may share them.

Tenant 2 is operating with a simulcast group size of 5. Thus 5 different RANs are allocated to each of the 5 sectors for this tenant. Note that since simulcast number of 5 is not an integer divisor of the number of cells in the RAN group, that number being 24 in this example, sector 3 has only 4 cells allocated to it. Tenant 3 is operating with the simulcast group size of 3 and thus is operating with 8 sectors, each having 3 RANs associated with it.

The hub interconnect in FIG. 5 then selects RAN 50 simulcast groupings for each sector based upon the desired groupings desired for each tenant. This permits for equalization of the radio frequency link budgets in each RAN 50 group. The open access product allows a tenant to customize the RAN 50 RF parameter settings to control the radio link environment, such as signal attenuation, gain, and other methods for strong signal mitigation.

In sector configuration of the system, the Hub/RAN ratio is configurable from 1 to 8 RANs per BTS sector. The RANs 50 is remote configurable through the open access operator's NMS 60, to support what is commonly referred to as sector reallocation. The sector allocation is defined by the hosted wireless service provider's traffic loading analysis and controlled by the inputs from the specific tenant's NMS 62 via the wide area network 65.

What is important to note here in the context of the present invention is that any given WSP or tenant may require access to only certain ones of the RAN slices at particular RANs 50, depending upon the simulcast configuration presently in place, and depending upon the types and amount of access that the individual tenant has requested from the operator of the open access system.

Returning attention now to FIGS. 1 and 2 briefly, in general, the data link uses one or more fiber optic connections between a hub 35 and one or more RANs 50. Data link uses a mix of electrical multiplexing, wavelength multiplexing, and multiple fibers to support the bandwidth requirements of the configuration in a cost-effective manner. Data link design should optimize its cost by using the best combination of different multiplexing schemes based on physical fiber costs, leased fiber costs and technology evolution. Data link supports whole RF band transportation (digitized RF), IP packets, ATM cells, and other traffic as need for open access signal transmission and system management and control.

The data link 40 connects a Hub 35 and multiple RANs 50 using either a Ring or Star network topology, or possibly a mix of the two. In one configuration, open access system 10 should support up to, for either a ring or star topology, at least several miles of fiber length. The actual fiber lengths will be guided by optical path link budgets and specific RF protocol limits.

With continuing reference to FIG. 1, it can now be better understood how operations and maintenance works for the open access system 10. Recall that the open access system 10 provides wireless signal distribution service for a number of different tenants or Wireless Service Providers (WSP) who ultimately provide service to the end users. The open access system tenants may typically lease RF bandwidth services and network management services from the operator of the open access system 10.

Such tenants are likely to require and benefit from having certain levels of operations, maintenance and control information concerning the open access system elements over which their own customers signals and information travel. For example, even a tenant is extremely concerned when system elements are not functional; however, such tenant have often devised their own management schemes for detecting, reporting, and acting upon such system events. The operator of the open access system 10 therefore implements the open access network management system (NMS) 60 and provides operational procedures that permit the tenants to perform certain system management functions in a coordinated manner.

The open access NMS 60 consists of a software system that is typically the sole or at least primary path for communication of control messages with the open access system elements such as the Hubs 35 and RANs 50. The communication consists of SNMP (Simple Network Management Protocol) messages and other messages using TCP/IP packets. The NMS 60 performs the functions of discovery, poll, status, control, forward, filter-SNMP, database, query and filter-query. For example, the discovery function polls the range of IP addresses to identify new Hubs 35 or RANs 50. The poll function polls specific Hubs 35 or RANs 50 to monitor health of network communication. The status function exchanges messages with specific services at Hub 35 or RAN 50 to monitor status. The control function sends messages from operator to Hub 35 or RAN 50. The forward function forwards messages from tenant NMSs 15 to Hub 35 or RAN 50. The filter-SNMP function filters forwarded messages to limit access by tenants 15 to status and control. The database function builds a database of information from the poll and status functions. The query function responds to database access queries from tenant NMSs 15. The filter-query function filters database queries to limit access by tenants 15 to status and control functions only.

Tenants need to monitor and control their leased portion of the open access network. 10 including certain aspects of the Hubs 35 and RANs 50. Tenants expect to have access to the information needed in a familiar form (compatible with industry NMS), and therefore expect to be able to use their own tenant NMS facilities 62a, 62b to accomplish this. The operator of the open access system 10 thus desires to provide these services to his tenants, however, while preventing access to information that individual tenants do not need or should not have the privileges to see. For example, one tenant should not have access to certain proprietary information concerning the slices installed for that tenant in a RAN, even when the RAN is shared among multiple tenants.

The tenant NMS 62 can use two forms of access to gather information, SNMP and database queries made to a local database maintained by the open access NMS 60. The open access NMS 60 can then either allow access or prevent access to the requested based upon privileges granted to specific tenants and for specific types of queries.

Figure 7:
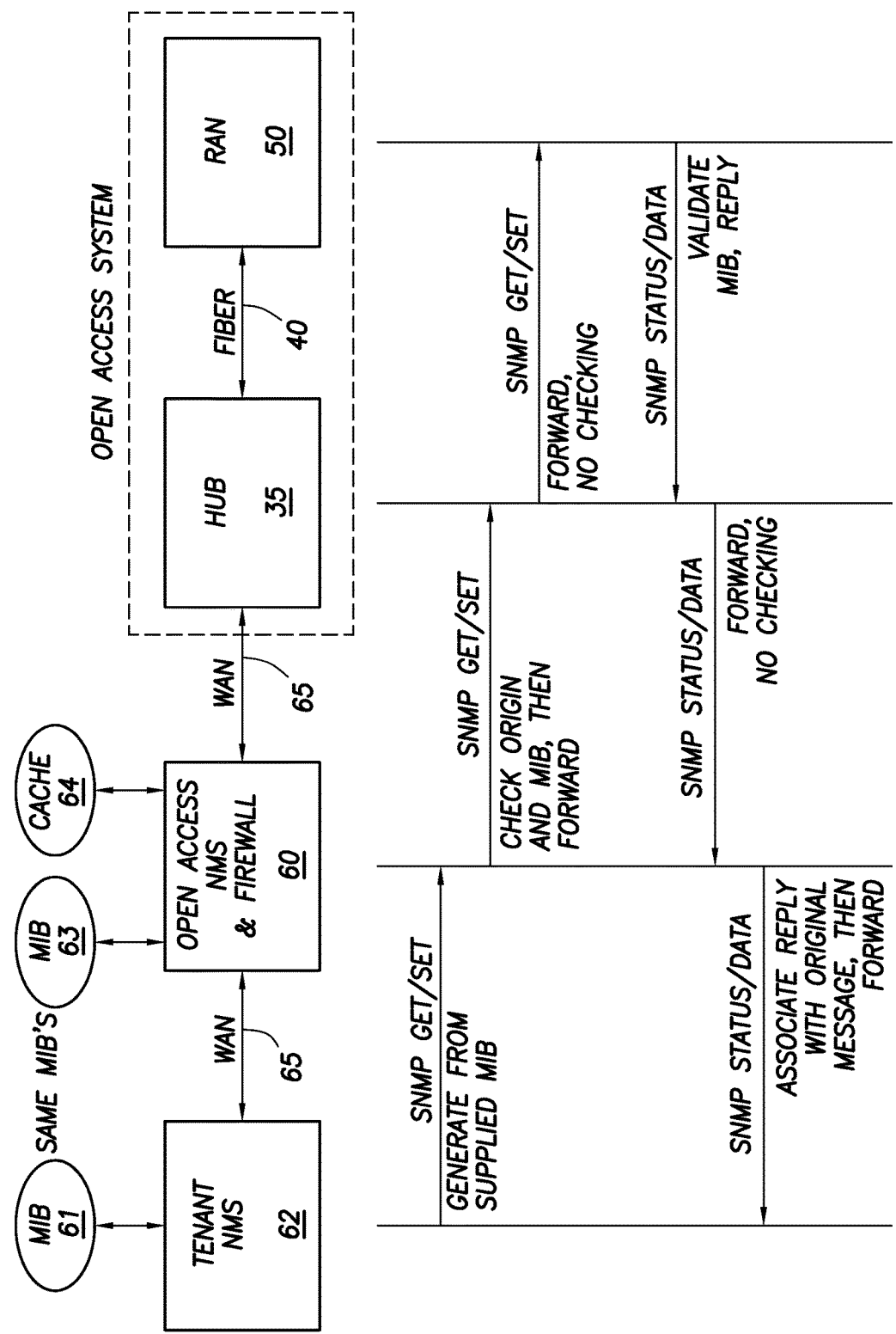
FIG. 7 is a message flow diagram illustrating how the open access system may provide for shared or open access Network Management System (NMS) functionality.

FIG. 7 depicts a first scenario for communication of operations, maintenance and control messages. The open access NMS can in one manner of thinking be described as a Statefull Firewall for SNMP traffic traveling between the tenant NMS 62 and the open access system elements 35, 50. The statefull firewall looks like an SNMP agent for the whole open access network 10 but looks like an SNMP client (or NMS) to the Hubs 35 and RAN's 50.

The statefull firewall software system in the open access NMS 60 contains a configuration file that defines the SNMP privileges (get, set, etc) that each SNMP client (e.g., the tenant NMS 62) can use, based upon, for example, the IP address of the client. Another portion of the TCP/IP protocol stack ensures that IP addresses actually come from an authorized client (to prevent IP address spoofing).

The scenario depicted in FIG. 7 in particular relates to a situation where a tenant originates a valid SNMP message and the open access NMS 60 forwards the message to one of the open access system elements 35, 50, which in turn responds with the requested information, that is then relayed back to the requesting tenant NMS. In a preferred embodiment, a sequence of events occurs as follows.

1. Tenant NMS has a Management Information Block (MIB) 61 that defines valid types and formats for SNMP GETs and SETs messages to be sent to the open access system elements 35, 50;
2. Tenant NMS creates an SNMP message that fits one of the MIB 61 entries;
3. Tenant NMS send an SNMP message to the open access statefull firewall NMS 60 over an wide area network 65;
4. The open access statefull firewall 60 then receives SNMP message with its SNMP agent software;
5. The incoming message is identified with the IP address of originating authorized tenant NMS 62;
6. The SNMP agent in the open access NMS 60 uses the Tenant identification information and SNMP address to look up the validity of message in a local MIB copy 63 of the MIB 61 in the originating tenant NMS 62;
7. The Message is determined to be valid, so the SNMP agent in the open access statefull firewall NMS forwards the message to open access Hub 35/RAN 50 network;
8. The addressed Hub 35 or RAN 50 receives the SNMP message and responds with a message back to the open access statefall firewall NMS 60;
9. The open access statefull firewall NMS 60 receives response and verifies its association with an SNMP message; it may also verifies the origin and destination IP addresses and perform other client to agent verification needed; and
10. The open access statefull firewall NMS 60 forwards the response on to the Tenant NMS 62 that originated the transaction.

Figure 8:
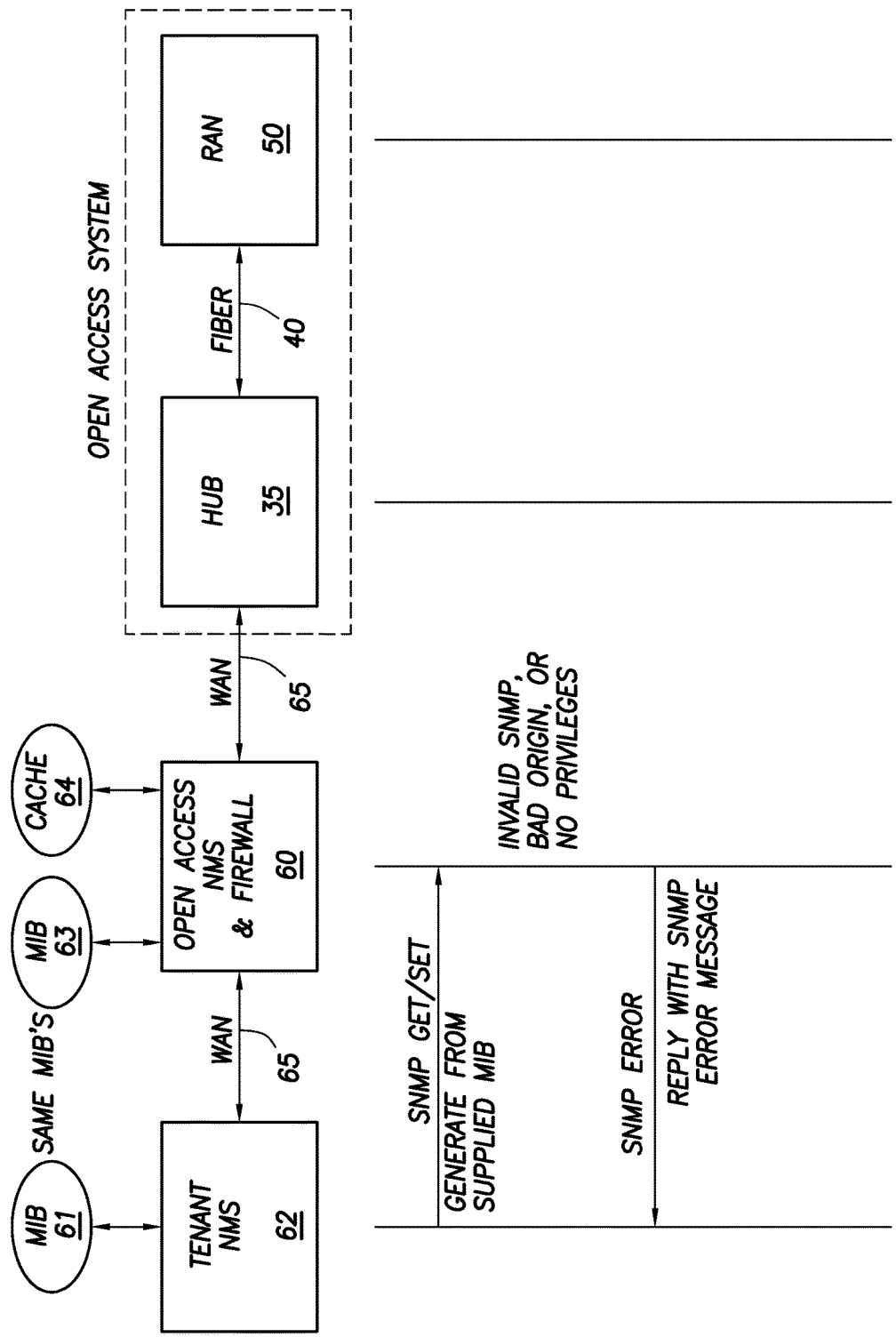
FIG. 8 is an illustration of a messaging scenario where a one tenant sends an SNMP message that the open access NMS may determine violates a privilege.

FIG. 8 describes another scenario where a tenant NMS 62 sends an SNMP message that the open access NMS 60 finds violates privileges and blocks the message Here, 1. Tenant NMS 62 has a MIB 61 that defines valid SNMP GETs and SETs;
2. Tenant NMS 62 creates an SNMP message that does not fit one of the MIB entries 61; for example the tenant NMS 62 may be originating a message that requests status information for a RAN slice in which it has not leased space;
3. The tenant NMS 62 send the SNMP message to the open access statefull NMS 60;
4. The open access statefull NMS 60 receives the SNMP message with its SNMP agent;
5. The incoming message is identified with IP address of the originating tenant NMS 62;
6. The SNMP agent uses the tenant identification and SNMP address in the message to look up the validity of message in its MIB 63;
7. The message is determined to be invalid; the SNMP agent in the open access statefull NMS 60 then sends an SNMP error message to back to the originating tenant NMS 62; and
8. The open access statefull NMS 60 writes a system log message noting an access privilege violation.

A "caching firewall" function may be implemented in the open access NMS 60 as a means to reduce SNMP network traffic on the open access system 10, such as may be due to several tenant NMS 62 making SNMP queries for the same information. The caching firewall functionality of the open access NMS 60 looks like an SNMP agent for the whole open access network 10. Where the statefull firewall feature described above forwards an SNMP message to the open access Hub/RANs, the caching firewall function may first attempt to access information gathered recently in its own database or cache 64, and responds with that data instead of creating additional network traffic to the hubs 35 and RANs 50.

FIG. 9 in particular further describes one scenario where a tenant NMS 62 sends SNMP Get message that the open access NMS 60 actual replies to by using recently cached data stored in its cache 64. The process proceeds as follows.

1. The tenant NMS 62 has a MIB 61 that defines valid SNMP GET and SET messages;
2. The tenant NMS 62 creates an SNMP message that fits one of the MIB 61 entries;
3. The tenant NMS 62 sends the SNMP message to open access caching firewall NMS 60;

4. The open access caching firewall NMS 60 receives the SNMP message with its SNMP agent;

5. The incoming message is identified with the IP address of the originating tenant NMS 62;

6. The SNMP agent uses the tenant identification and SNMP address to look up the validity of the message;

7. The message is valid, so the open access SNMP agent 60 then checks for a recent copy of the same information in its data base or cache 62;

8. Noting that the request information exists with a recent update in the cache 62, the open access SNMP agent then formulates an SNMP reply with the information; and 9. The open access caching firewall 60 function then sends the response on to the tenant NMS 62 that originated the transaction.

FIG. 10 illustrates a messaging scenario where tenants 62 may gather large blocks of data from the open access NMS 60 without the overhead of SNMP messaging. In particular, the open access NMS 60 maintains a database of recently gathered SNMP data, such as in its cache 64. This recently gathered data can come from keeping cached copies of SNMP GETs made by tenant NMS 62 or by SNMP GETs made by the open access NMS 60. In some cases, the open access NMS 60 will make SNMP requests autonomously, typically solely for the purpose of keeping its cache 64 current.

In the FIG. 10 process:

1. Tenant NMS 62 has database query scripts written to gather data efficiently;

2. Tenant NMS 62 creates a valid database query message;

3. Tenant NMS 62 sends the query message to the open access caching firewall 60;

4. The open access caching firewall 60 receives the query message, such as with a database server 66;

5. The incoming message is identified with the IP address of the originating tenant NMS 62;

6. The database server 66 uses the tenant identification and query to check the validity of the database access message; and 7. If the message is valid, the open access database server 66 sends data back to the tenant NMS 62 that originated the query.

While this invention has been particularly shown and described with references to preferred embodiments thereof, it will be understood by those skilled in the art that various changes in form and details may be made therein without departing from the scope of the invention encompassed by the appended claims. A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
a first unit to receive a first wireless service provider signal from a first wireless service provider network operated by a first wireless service provider and to receive a second wireless service provider signal from a second wireless service provider network operated by a second wireless service provider;
wherein the first unit comprises a transport medium interface to produce a common transport signal from the first wireless service provider signal and from the second wireless service provider signal and to communicate the common transport signal on a common transport medium;
wherein the system further comprises a plurality of remotely located second units, each second unit connected to the common transport medium to receive the common transport signals from the common transport medium, and each second unit comprising first equipment associated with the first wireless service provider and second equipment associated with the second wireless service provider;
wherein, for each of the second units, the first equipment in that second unit produces a respective first wireless service signal to be radiated from at least one antenna associated with that second unit, the respective first wireless service signal being produced from the common transport signal; and
wherein, for each of the second units, the second equipment in that second unit produces a respective second wireless service signal using the second equipment included in that second unit to be radiated from at least one antenna associated with that second unit, the respective second wireless service signal being produced from the common transport signal; and
wherein the system further comprises a common network management system configured to:
receive first control messages from a first wireless service provider network management system operated by the first wireless service provider;
receive second control messages from a second wireless service provider network management system operated by the second wireless service provider;
forward the first control messages to the first equipment in the second units using the common transport medium; and
forward the second control messages to the second equipment in the second units using the common transport medium.

2. The system of claim 1, wherein the common network management system is configured to:
receive third control messages from the first equipment in the second units via the common transport medium;
receive fourth control messages from the second equipment in the second units via the common transport medium;
forward the third control messages to the first wireless service provider network management system operated by the first wireless service provider; and
forward the fourth control messages to the second wireless service provider network management system operated by the second wireless service provider.

3. The system of claim 2, wherein the common network management system filters the first, second, third, and fourth control messages to limit access by the first wireless service provider to status and control information associated with the first equipment in the second units and to limit access by the second wireless service provider to status and control information associated with the second equipment in the second units.

4. The system of claim 3, wherein the common network management system comprises a statefull firewall that is configured to filter the first, second, third, and fourth control messages.

5. The system of claim 1, wherein the common network management system is configured to appear to the first wireless service provider network management system to be an agent for the first control messages and is configured to appear to the second wireless service provider network management system to be an agent for the second control messages.

6. The system of claim 5, wherein the common network management system is configured to appear to the first equipment in the second units to be a client for the first control messages and is configured to appear to the second equipment in the second units to be a client for the second control messages.

7. The system of claim 1, wherein the common network management system comprises:
a local data store to maintain configuration information that defines access privileges for the first and second wireless service provider network management systems.

8. The system of claim 1, wherein the common network management system comprises:
a local database to store data taken from poll and status information requests originated by the common network management system.

9. The system of claim 1, wherein the first and second wireless service signals comprise first and second cellular service signals.

10. A method comprising:
receiving, at a first unit, a first wireless service provider signal from a first wireless service provider network operated by a first wireless service provider; and
receiving, at the first unit, a second wireless service provider signal from a second wireless service provider network operated by a second wireless service provider;
producing a common transport signal from the first wireless service provider signal and from the second wireless service provider signal;
communicating the common transport signal on a common transport medium to a plurality of second units;
at each second unit of the plurality of second units:
producing a respective first wireless service signal to be radiated from at least one antenna associated with that second unit, the respective first wireless service signal is produced using the first equipment included in that second unit from the common transport signal; and
producing a respective second wireless service signal to be radiated from at least one antenna associated with that second unit, the respective second wireless service signal is produced using the second equipment included in that second unit from the common transport signal;
receiving, at a common network management system, first control messages from a first wireless service provider network management system operated by the first wireless service provider;
receiving, at the common network management system, second control messages from the second wireless service provider network management system operated by the second wireless service provider;
forwarding the first control messages to the first equipment in the second units using the common transport medium; and forwarding the second control messages to the second equipment in the second units using the common transport medium.

11. The method of claim 10, further comprising:
receiving, at the common network management system, third control messages from the first equipment in the second units via the common transport medium;
receiving, at the common network management system, fourth control messages from the second equipment in the second units via the common transport medium;
forwarding the third control messages to the first wireless service provider network management system operated by the first wireless service provider; and
forwarding the fourth control messages to the second wireless service provider network management system operated by the second wireless service provider.

12. The method of claim 11, further comprising filtering the first, second, third, and fourth control messages to limit access by the first wireless service provider to status and control information associated with the first equipment in the second units and to limit access by the second wireless service provider to status and control information associated with the second equipment in the second units.

13. The method of claim 12, wherein filtering the first, second, third, and fourth control messages comprises filtering the first, second, third, and fourth control messages by a statefull firewall included in the common network management system.

14. The method of claim 10, further comprising:
appearing, by the common network management system, to the first wireless service provider network management system to be an agent for the first control messages; and
appearing, by the common network management system, to the second wireless service provider network management system to be an agent for the second control messages.

15. The method of claim 14, further comprising:
appearing, by the common network management system, to the first equipment in the second units to be a client for the first control messages; and
appearing, by the common network management system, to appear to the second equipment in the second units to be a client for the second control messages.

16. The method of claim 10, further comprising:
maintaining, in a local data store associated with the common network management system, configuration information that defines access privileges for the first and second wireless service provider network management systems.

17. The method of claim 10, further comprising:
storing, in a local database associated with the common network management system, data taken from poll and status information requests originated by the common network management system.

18. The method of claim 10, wherein the first and second wireless service signals comprise first and second cellular service signals.

* * * * *